United States Patent
Darabi

(10) Patent No.: US 7,285,993 B2
(45) Date of Patent: Oct. 23, 2007

(54) METHOD AND SYSTEM FOR A DIVIDE BY N CIRCUIT WITH DUMMY LOAD FOR MULTIBAND RADIOS

(75) Inventor: Hooman Darabi, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 83 days.

(21) Appl. No.: 10/977,631

(22) Filed: Oct. 29, 2004

(65) Prior Publication Data

US 2006/0091919 A1    May 4, 2006

(51) Int. Cl.
*H03K 21/00*    (2006.01)
*H03K 23/00*    (2006.01)
*H03K 25/00*    (2006.01)

(52) U.S. Cl. ....................... 327/115; 327/117

(58) Field of Classification Search .............. 327/115, 327/117

See application file for complete search history.

(56) References Cited

U.S. PATENT DOCUMENTS

| | | | | |
|---|---|---|---|---|
| 5,903,175 A | * | 5/1999 | Miyashita | .................. 327/218 |
| 6,163,182 A | * | 12/2000 | Canard et al. | ............... 327/117 |
| 6,249,157 B1 | * | 6/2001 | Nakura et al. | ............... 327/117 |
| 6,260,181 B1 | * | 7/2001 | Inoue | ........................... 716/10 |
| 6,516,214 B1 | * | 2/2003 | Boas | ........................... 600/431 |
| 6,888,392 B2 | * | 5/2005 | Wei et al. | .................... 327/295 |

* cited by examiner

*Primary Examiner*—Quan Tra
(74) *Attorney, Agent, or Firm*—McAndrews, Held & Malloy, Ltd.

(57) ABSTRACT

Certain embodiments of the invention provide a method and system for symmetrically loading a divider circuit for multi-band receivers. The method may comprise coupling a second divider circuit to an I component output signal of a first divider circuit and coupling a dummy load to a Q component output signal of the first divider circuit. The dummy load may comprise a load that may be equivalent to the second divider circuit. At least an I component output signal may be generated from the second divider circuit. At least a Q component signal may be generated from the second divider circuit. At least an I component signal generated from the first divider circuit may be received by the second divider circuit. At least a Q component signal generated from the first divider circuit may be received by a dummy load.

25 Claims, 6 Drawing Sheets

METHOD AND SYSTEM FOR A DIVIDE BY N CIRCUIT WITH DUMMY LOAD FOR MULTIBAND RADIOS

CROSS-REFERENCE TO RELATED APPLICATIONS/INCORPORATION BY REFERENCE

This application is related to the following applications, each of which is incorporated herein by reference in its entirety for all purposes:

U.S. patent application Ser. No. 10/976,976 filed Oct. 29, 2004;
U.S. patent application Ser. No. 10/976,977 filed Oct. 29, 2004;
U.S. patent application Ser. No. 10/977,000 filed Oct. 29, 2004;
U.S. patent application Ser. No. 10/976,575 filed Oct. 29, 2004;
U.S. patent application Ser. No. 10/977,464 filed Oct. 29, 2004;
U.S. patent application Ser. No. 10/977,798 filed Oct. 29, 2004;
U.S. patent application Ser. No. 10/977,005 filed Oct. 29, 2004;
U.S. patent application Ser. No. 10/977,771 filed Oct. 29, 2004;
U.S. patent application Ser. No, 10/977,868 filed Oct. 29, 2004;
U.S. patent application Ser. No. 10/976,666 filed Oct. 29, 2004;
U.S. patent application Ser. No. 10/976,639 filed Oct. 29, 2004;
U.S. patent application Ser. No. 10/977,210 filed Oct. 29, 2004;
U.S. patent application Ser. No. 10/977,872 filed Oct. 29, 2004;
U.S. patent application Ser. No. 10/977,869 filed Oct. 29, 2004;
U.S. patent application Ser. No. 10/977,874 filed Oct. 29, 2004; and
U.S. patent application Ser. No. 10/976,996 filed Oct. 29, 2004.

FIELD OF THE INVENTION

Certain embodiments of the invention relate to multiband radios. More specifically, certain embodiments of the invention relate to a method and system for a divide-by-N circuit with dummy load for multiband radios.

BACKGROUND OF THE INVENTION

The evolution from wireless based voice only communication networks to wireless based voice and data communication networks has resulted in the development of general packet radio service (GPRS) and enhanced data rates for the global system for mobile communications (GSM) standards. Although speech still remains the dominant service by many cellular service providers, existing systems are being upgraded to provide greater support for data communication via the radio interface.

In digital communications, modulation signals may be expressed in terms of I and Q components, which may be a rectangular representation of a polar diagram. FIG. 1 is a diagram illustrating the inphase and quadrature (I-Q) format utilized in digital communications. On a polar diagram, the inphase (I) axis lies on the zero degree phase reference, and the quadrature (Q) axis is rotated by 90 degrees with respect to the inphase (I) axis. The signal vector's projection onto the I-axis is its I component and the projection onto the Q axis is its Q component.

With reference to FIG. 1, a circuit may have perfect I-Q matching when the I and Q components of a signal are exactly 90 degrees phase shifted. When the I and Q components of the signal are not 90 degrees phase shifted, the performance of the system may deteriorate. For example, in certain circuits where the I processing path and Q processing path are not equally loaded, the loading mismatch may cause degradation in system performance. In case of a divide-by-two circuit, I-Q mismatch may occur when the first divide-by-two circuit is not loaded symmetrically.

FIG. 2a is a block diagram illustrating asymmetric loading in a divide-by-two circuit. Referring to FIG. 2a, there is shown a system 200 that comprises a plurality of divide-by-two circuits 202 and 204. The divide-by-two circuit 202 may generate the I and Q components of a signal. The divide-by-two circuit 204 may be adapted to receive the I component and generate the I and Q components of a second signal, for example. The Q component generated by the divide-by-two circuit 202 may not be coupled to another divide-by-two circuit, which may cause asymmetric loading of the divide-by-two circuit 202. The asymmetric loading of the divide-by-two circuit 202 may cause I-Q mismatch resulting in a deteriorated performance. The divide-by-two circuit 202 may be adapted to generate an output quadrature Q signal, for example, for PCS/DCS band and/or 802.11 a/g operation. The divide-by-two circuit 204 may be adapted to generate an output quadrature Q signal, for example, for GSM 850/GSM 900 band and/or 802.11 a/g operation.

FIG. 2b is a block diagram that may be utilized to overcome the asymmetric loading problem associated with FIG. 2a. Referring to FIG. 2b, there is shown a system 220 that comprises a plurality of divide-by-two circuits 222, 224 and 226. The divide-by-two circuit 222 may generate the I and Q components of a signal. The divide-by-two circuit 224 may be adapted to receive the I component and generate the I and Q components of a second signal, for example. The divide-by-two circuit 226 may be adapted to receive the Q component and generate the I and Q components of a third signal, for example. This is an easy way to balance the I and Q paths. However, the divide-by-two circuit 224 may take up additional area. Furthermore, it may consume additional power, which is a premium in mobile devices such as cell phones.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention provide a method and system for a divide-by-N circuit with dummy load for multiband radios. In an embodiment of the invention, a method for symmetrically loading a divider circuit for multiband receivers may be provided. The method may comprise coupling a second divider circuit to an I component output signal of a first divider circuit and coupling a dummy load to a Q component output signal of the first divider circuit. The dummy load may comprise a load that may be equivalent to the second divider circuit. At least an I component output signal may be generated from the second divider circuit. At least a Q component signal may be generated from the second divider circuit. At least an I component signal generated from the first divider circuit may be received by the second divider circuit. At least a Q component signal generated from the first divider circuit may be received by a dummy load.

In another aspect of the invention, a method for symmetrically loading a divider circuit for multiband receivers may be provided. The method may comprise receiving an I component signal by a second divider circuit from a first divider circuit and receiving a Q component signal by a dummy load from said first divider circuit. The dummy load may comprise a load that may be equivalent to a load of the second divider circuit. At least an I component signal may be generated from the first divider circuit. At least a Q component signal may be generated from the first divider circuit. At least an I component output signal may be generated from the second divider circuit. At least a Q component signal may be generated from the second divider circuit.

In accordance with an embodiment of the invention, a system for symmetrically loading a divider circuit for multiband receivers may be provided. In this regard, a second divider circuit may be coupled to an I component output signal of a first divider circuit and a dummy load may be coupled to a Q component output signal of the first divider circuit. The dummy load may comprise a load that may be equivalent to the second divider circuit. The second divider circuit may comprise logic and/or circuitry that may be adapted to generate an I component output signal and a Q component output signal. The second divider circuit may be adapted to receive an I component signal that may be generated from the first divider circuit. The dummy load may be adapted to receive a Q component signal that may be generated from the first divider circuit.

In another aspect of the invention, a system for symmetrically loading a divider circuit for multiband receivers may be provided. In this regard, a second divider circuit may be adapted to receive an I component signal from a first divider circuit and a dummy load may be adapted to receive a Q component signal from the first divider circuit. The dummy load may comprise a load that may be equivalent to a load of the second divider circuit. The first divider circuit may be adapted to generate an I component signal and a Q component signal. The second divider circuit may be adapted to generate an I component signal and a Q component signal.

In accordance with another embodiment of the invention, a divider circuit may comprise an output circuit. A drain of at least a first transistor may be coupled to the output circuit and a drain of at least a third transistor. A drain of at least a second transistor may be coupled to the output circuit and a drain of at least a fourth transistor. The drain of the third transistor may be coupled to the output circuit and the drain of the first transistor. The drain of the fourth transistor may be coupled to the output circuit and the drain of the second transistor. A source of the first transistor may be coupled to a source of the second transistor and a drain of at least a fifth transistor. A source of the third transistor may be coupled to a source of the fourth transistor and a drain of at least a seventh transistor. A source of the fifth transistor may be coupled to a drain of at least a sixth transistor. A source of the seventh transistor may be coupled to a drain of at least a eighth transistor. The divider circuit may comprise a first input that may be coupled to a gate of the first transistor. A second input may be coupled to a gate of the second transistor. A third input may be coupled to a gate of the third transistor and a fourth input may be coupled to a gate of the fourth transistor. The divider circuit may further comprise a voltage source coupled to a gate of the fifth transistor, a gate of the sixth transistor and a gate of the seventh transistor. The first input and the second input may be complementary. Similarly, the third input and the fourth input may be complementary. The first transistor, second transistor, third transistor, fourth transistor, fifth transistor, sixth transistor, seventh transistor and eighth transistor may be NMOS transistors. A substrate of the first transistor, a substrate of the second transistor, a substrate of the third transistor and a substrate of the fourth transistor may be coupled to ground. The source of the sixth transistor, source of the eighth transistor and gate of the eighth transistor may be coupled to ground.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 2b is a block diagram that may be utilized to overcome the asymmetric loading problem associated with FIG. 2a.

DETAILED DESCRIPTION OF THE INVENTION

Certain embodiments of the invention provide a method and system for a divide-by-N circuit with dummy load for multiband radios. In an embodiment of the invention, a method for symmetrically loading a divider circuit for multiband receivers may be provided. The method may comprise coupling a second divider circuit to an I component output signal of a first divider circuit and coupling a dummy load to a Q component output signal of the first divider circuit. The dummy load may comprise a load that may be equivalent to the second divider circuit. At least an I component output signal may be generated from the second divider circuit. At least a Q component signal may be generated from the second divider circuit. At least an I component signal generated from the first divider circuit may be received by the second divider circuit. At least a Q component signal generated from the first divider circuit may be received by a dummy load.

Figure 1:
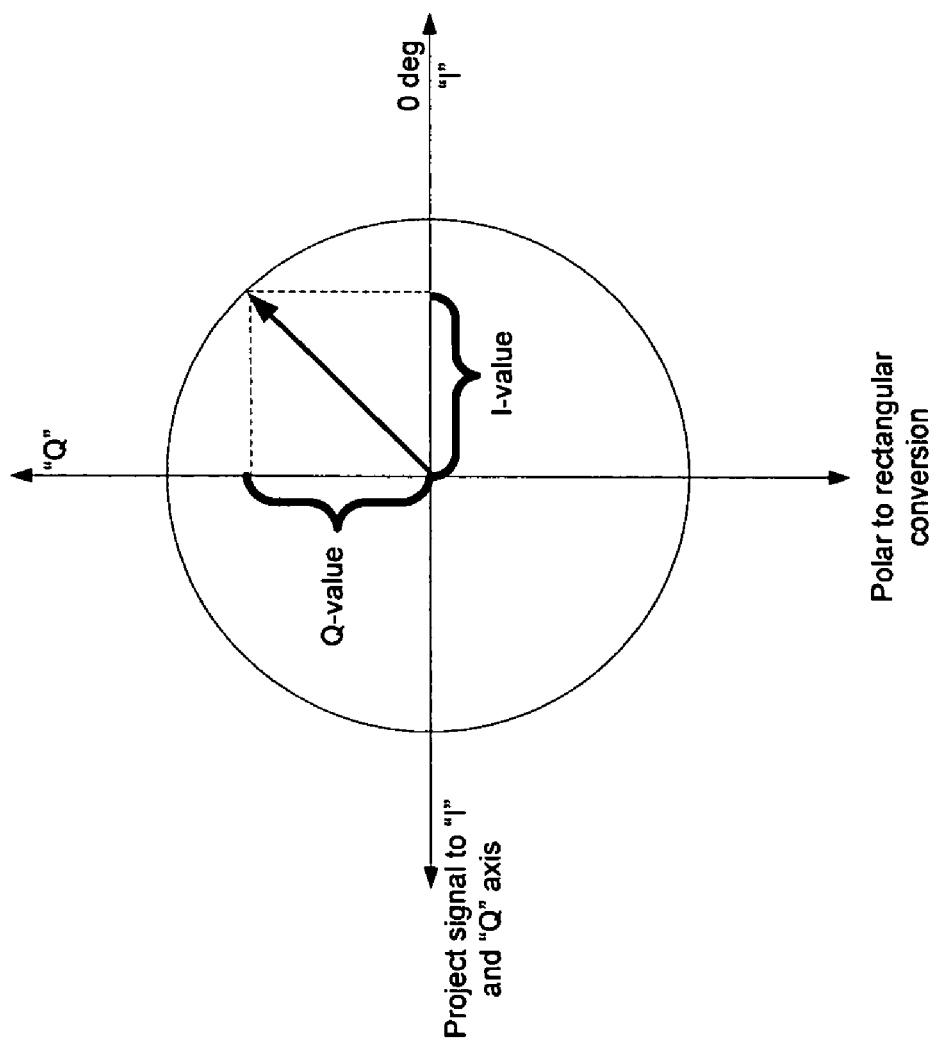
FIG. 1 is a diagram illustrating the I-Q format utilized in digital communications.
Figure 2A:
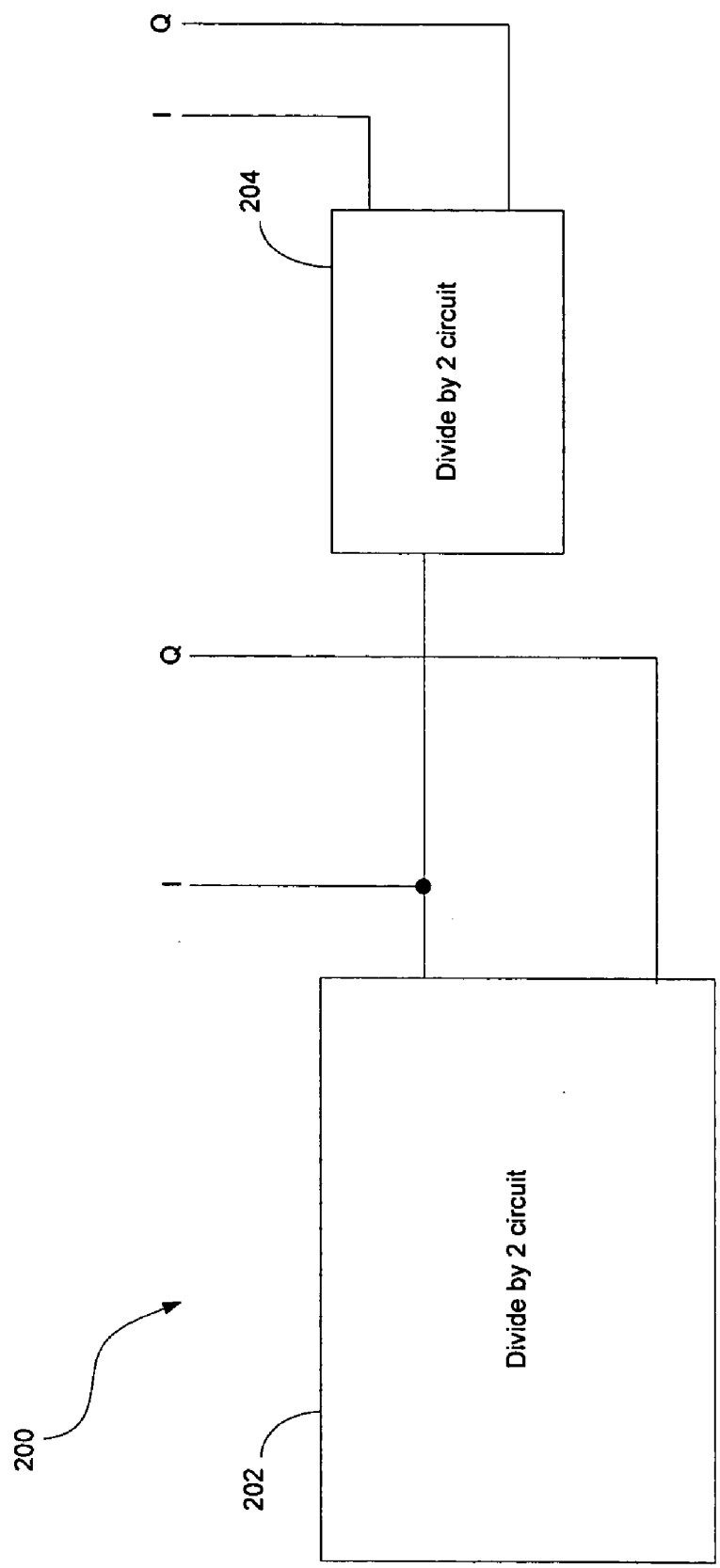
FIG. 2a is a block diagram illustrating asymmetric loading in a divide-by-two circuit.
Figure 2B:
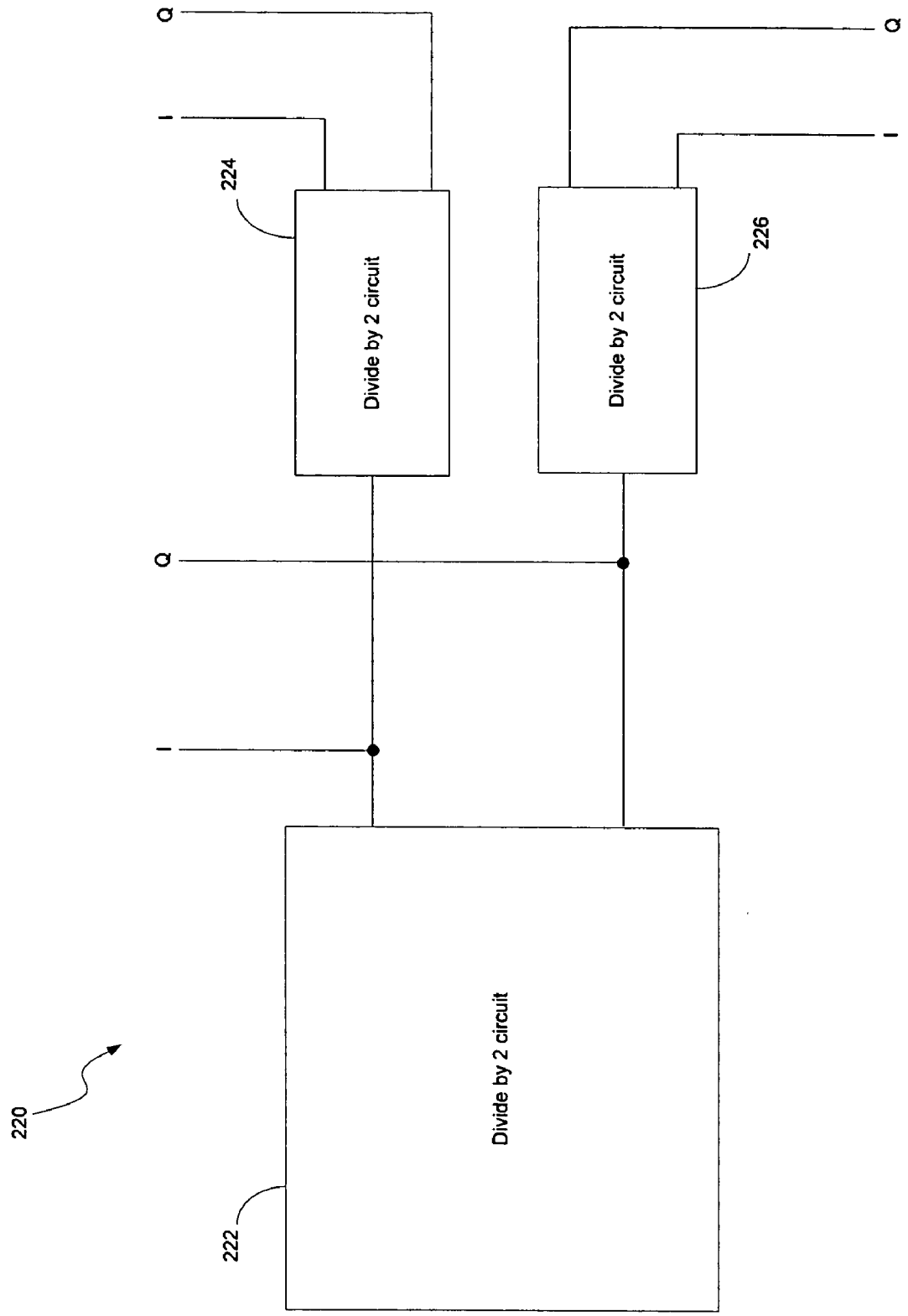
Figure 3:
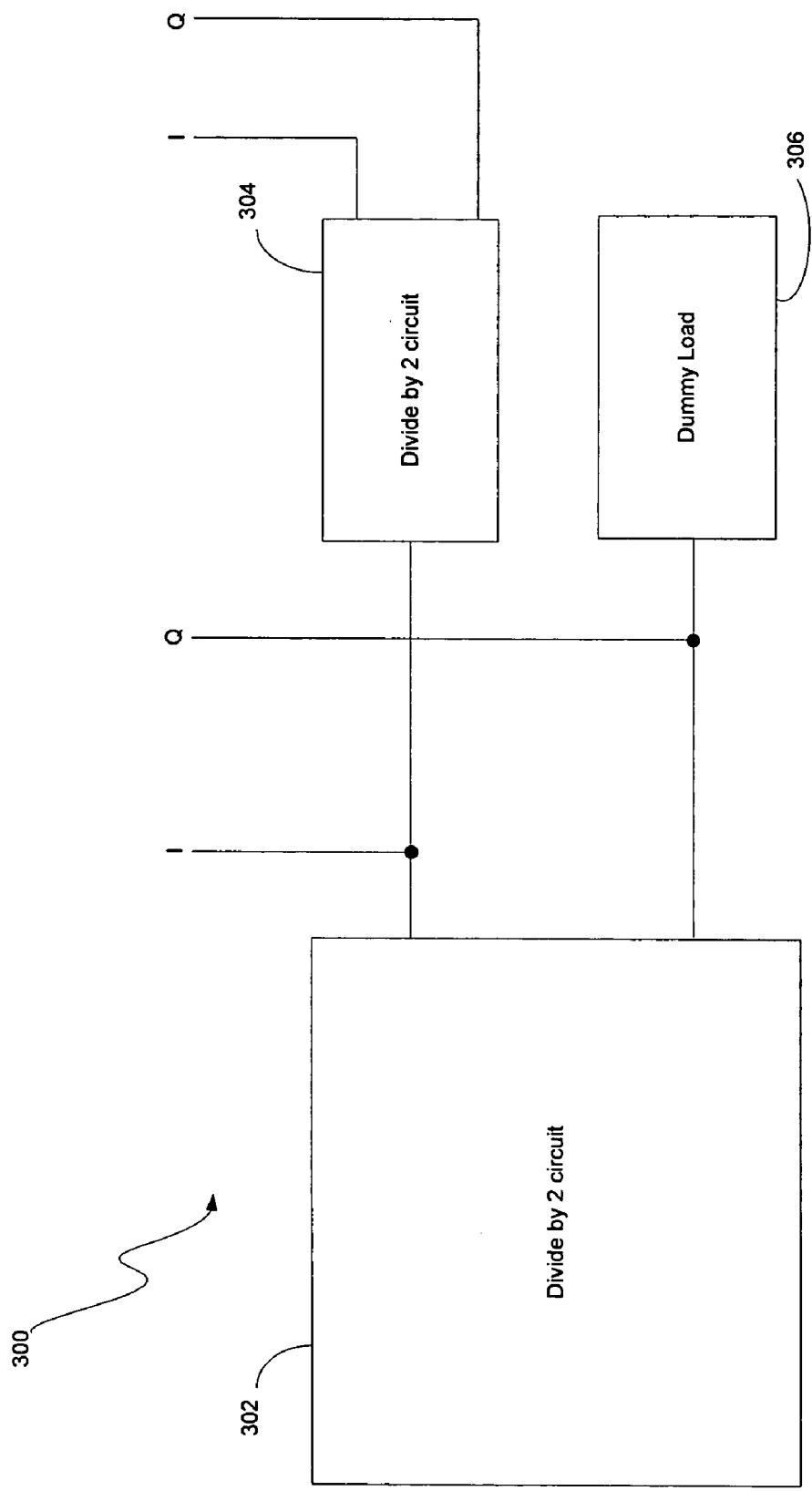
FIG. 3 is a block diagram illustrating symmetric loading in a divide-by-two circuit, in accordance with an embodiment of the invention.

FIG. 3 is a block diagram illustrating symmetric loading in a divide-by-two circuit, in accordance with an embodiment of the invention. Referring to FIG. 3, there is shown a system 300 that comprises a plurality of divide-by-two circuits 302, 304 and 306. The divide-by-two circuit 304 may be coupled to the I component output of the divide-by-two circuit 302. The dummy load 306 may be coupled to the Q component output of the divide-by-two circuit 302.

In operation, the divide-by-two circuit 302 may generate the I and Q components of a signal. The divide-by-two circuit 304 may be adapted to receive the I component and generate the I and Q components of a second signal, for example. The Q component generated by the divide-by-two circuit 302 may be coupled to a dummy load with negligible power consumption. This results in symmetric loading of the divide-by-two circuit 302 and perfect I-Q matching.

Figure 4:
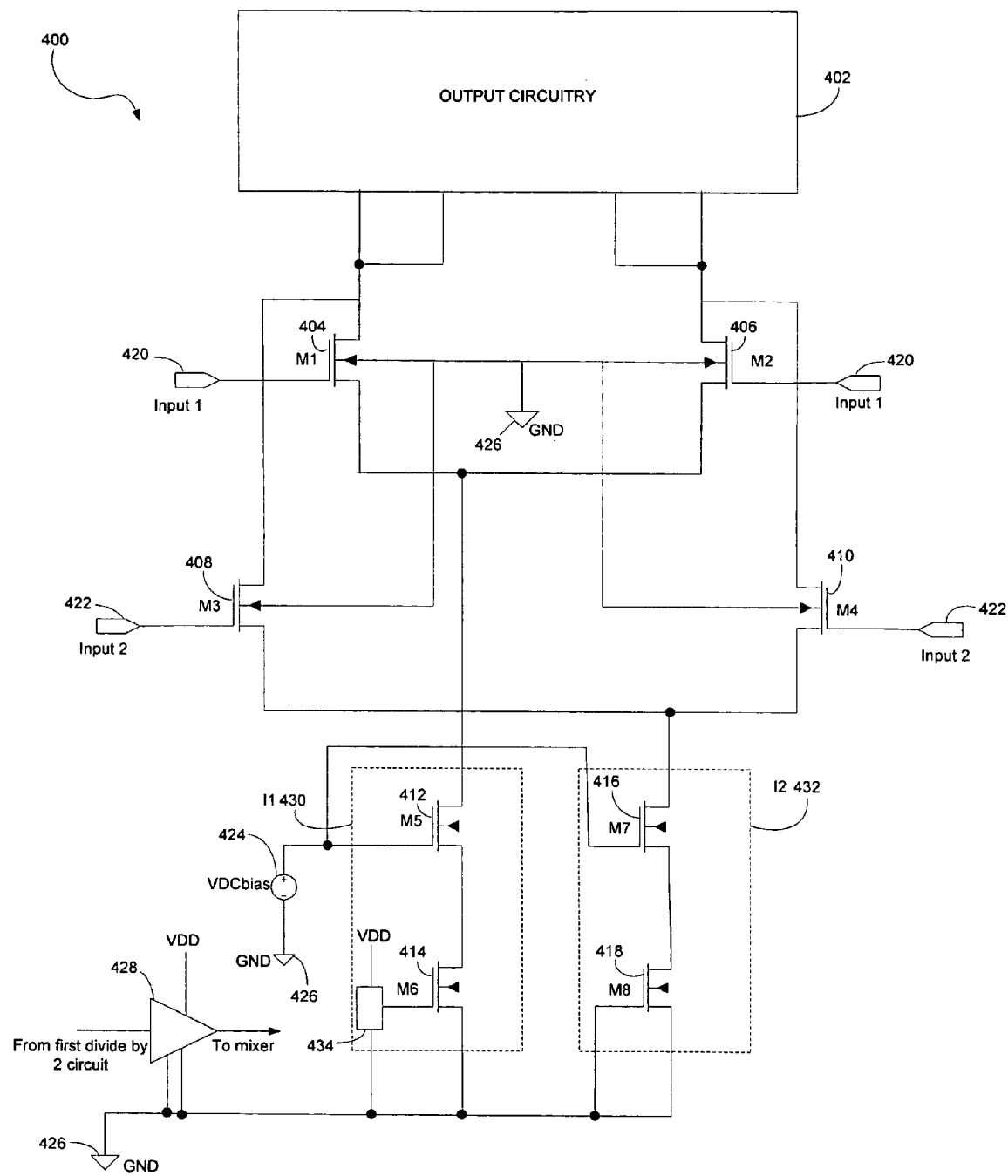
FIG. 4 is a block diagram of an exemplary divide-by-two circuit with a dummy load, in accordance with an embodiment of the invention.

FIG. 4 is a block diagram of an exemplary divide-by-two circuit with a dummy load as illustrated in FIG. 3, in accordance with an embodiment of the invention. Referring to FIG. 4, there is shown a system 400 that comprises an output stage 402, a plurality of NMOS transistors M1 404, M2 406, M3 408, M4 410, a plurality of inputs including input_1 420 and input_2 422, a DC bias voltage VDCbias 424, a plurality of connections to a common ground GND 426, a buffer 428, a plurality of current sources $I_1$ 430 and $I_2$ 432 and a control switch 434. The current source $I_1$ may comprise a plurality of NMOS transistors M5 412 and M6 414 and the current source $I_2$ may comprise a plurality of NMOS transistors M7 416 and M8 418.

The output circuitry block 402 may comprise logic and/or circuitry that may be adapted to receive and process a plurality of input I/Q signals. The output circuitry block 402 may comprise a plurality of elements, for example, an analog latch, a sense block and/or load resistors. The NMOS transistor M1 404 may be adapted to receive an input signal Input_1 420 at its gate. The drain of M1 404 may be coupled to the output circuitry block 402 and the drain of M3 408. The source of M1 404 may be coupled to the source of M2 406 and the drain of M5 412. The substrate of M1 404 may be coupled to the substrate of M2 406 and the ground GND 426. The NMOS transistor M2 406 may be adapted to receive an input signal Input_1 420 at its gate. The drain of M2 406 may be coupled to the output circuitry block 402 and the drain of M4 410. The source of M2 406 may be coupled to the source of M1 404 and the drain of M5 412. The substrate of M2 406 may be coupled to the substrate of M1 404 and the ground GND 426.

The NMOS transistor M3 408 may be adapted to receive an input signal Input_2 422 at its gate. The drain of M3 408 may be coupled to the drain of M1 404. The source of M3 408 may be coupled to the source of M4 410 and the drain of M7 416. The substrate of M3 408 may be coupled to the substrate of M1 404, the substrate of M2 406 and the ground GND 426. The NMOS transistor M4 410 may be adapted to receive an input signal Input_2 422 at its gate. The drain of M4 410 may be coupled to the drain of M2 406. The source of M4 410 may be coupled to the source of M3 408 and the drain of M7 416. The substrate of M4 410 may be coupled to the substrate of M1 404, the substrate of M2 406 and the ground GND 426.

The input signal Input_1 420 may be the I component of the differential input signal. The input signal Input_2 422 may be the Q component of the differential input signal. The DC bias voltage VDCbias 424 may comprise suitable circuitry that may be adapted to generate a DC bias voltage to the gates of the NMOS transistors M5 412, and M7 416. The buffer 428 may be adapted to receive a signal from a first divide-by-two circuit and generate an output signal to a mixer. The buffer may receive a bias voltage from a voltage source VDD and may be coupled to the ground GND 426. The control switch 434 may be coupled to the gate of the NMOS transistor M6 414. The control switch 434 may be adapted to turn ON a device, for example, the NMOS transistor M6 414 may be turned ON during a GSM 850/GSM 900 band operation by coupling the gate of the NMOS transistor M6 414 to a voltage source VDD. Similarly, the control switch 434 may be adapted to turn OFF a device, for example, the NMOS transistor M6 414 may be turned OFF during a PCS/DCS band operation by coupling the gate of the NMOS transistor M6 414 to the ground GND 426. In the latter case, the two current sources $I_1$ and $I_2$ may be identical and may provide symmetrical loading to the I and Q components generated by the first divide-by-two circuit 302 [FIG. 3].

The current source $I_1$ may comprise a plurality of NMOS transistors M5 412 and M6 414. The gate of the NMOS transistor M5 412 may be coupled to the DC bias voltage VDCbias 424. The drain of M5 412 may be coupled to the source of M1 404 and the source of M2 406. The source of M5 412 may be coupled to the drain of M6 414. The gate of the NMOS transistor M6 414 may be coupled to the DC bias voltage VDCbias 424. The drain of M6 414 may be coupled to the source of M5 412. The source of M6 414 may be coupled to the ground GND 426.

The current source $I_2$ may comprise a plurality of NMOS transistors M7 416 and M8 418. The gate of the NMOS transistor M7 416 may be coupled to the DC bias voltage VDCbias 424. The drain of M6 416 may be coupled to the source of M3 408 and the source of M4 410. The source of M7 416 may be coupled to the drain of M8 418. The gate of the NMOS transistor M8 418 may be coupled to the ground GND 426. The drain of M8 418 may be coupled to the source of M6 416. The source of M8 418 may be coupled to the ground GND 426. The substrate of a transistor may be sometimes referred to as the bulk, body or a well of a transistor.

In operation, the input signal Input_1 420 may be the I component of the differential input signal, while the input signal Input_2 422 may be the Q component of the differential input signal. The second divide-by-two circuit may receive identical inputs from the I and Q outputs generated by the first divide-by-two circuit, if it is loaded symmetrically. The gate of the NMOS transistor 418 may be coupled to the ground GND 426. As a result, the current source $I_2$ 432 is switched OFF and may not consume any extra power.

In the case of a DCS/PCS band application, for example, the second divide-by-two circuit 400 may be switched OFF. As a result, the current source $I_1$ 430 is switched OFF. When both the current sources $I_1$ and $I_2$ are OFF, the first divide-by-two circuit is symmetrically loaded with the second divide-by-two circuit. In the case of a GSM 850/GSM 900 band application, for example, the current source $I_1$ is ON and the first divide-by-two circuit may be loaded asymmetrically. The outputs generated by the second divide-by-two circuit may be symmetric irrespective of the asymmetric/symmetric loading of the first divide-by-two circuit. As a result, the output signals may be generated with perfect I-Q matching.

The method and system for a divide-by-two circuit with dummy load for multiband radios may be applied to any multi-band application, where a divide-by-two circuit may be utilized to generate low frequency signals.

Figure 5:
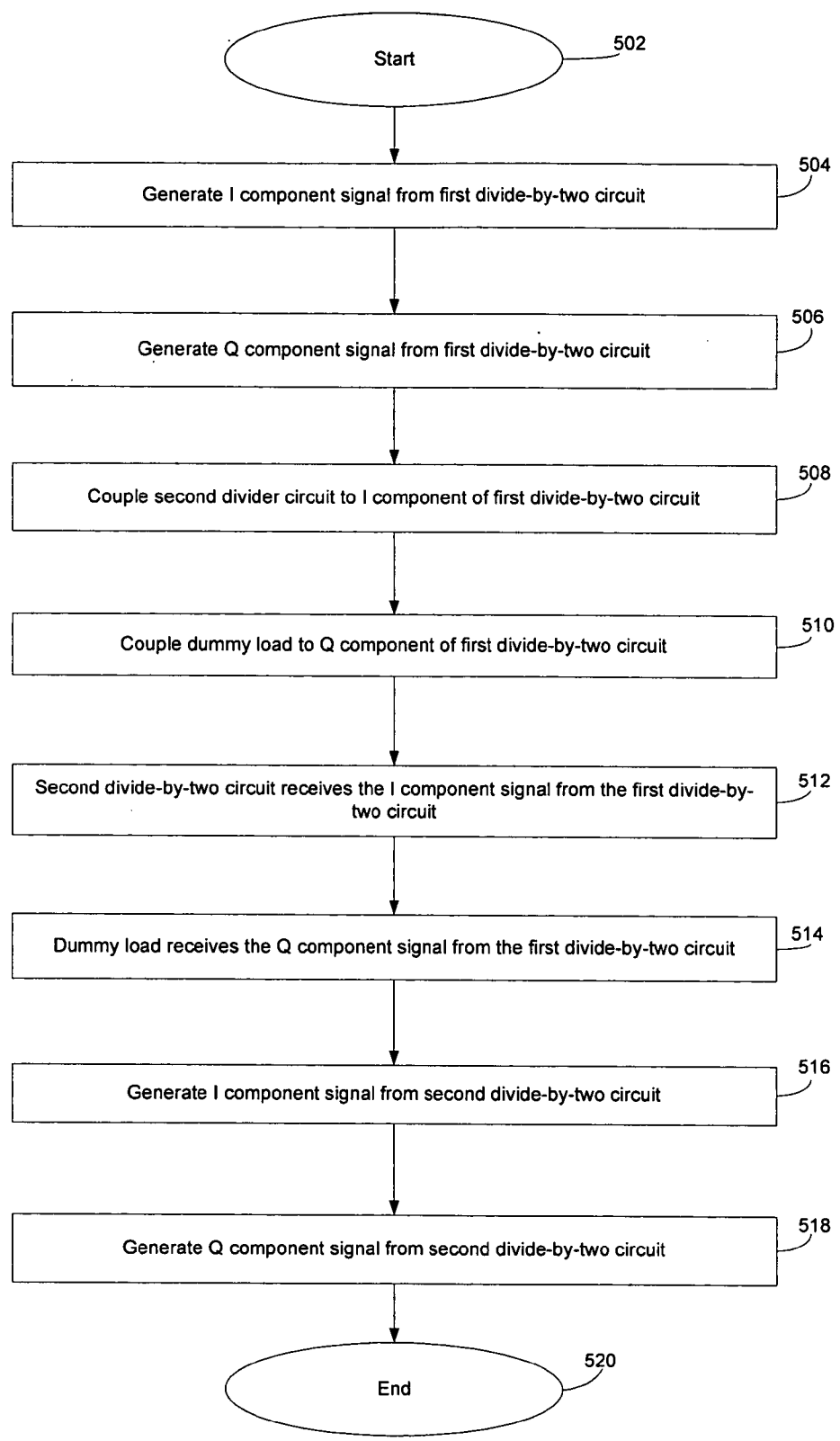
FIG. 5 is a flowchart illustrating symmetric loading in a divide-by-two circuit, in accordance with an embodiment of the invention.

FIG. 5 is a flowchart illustrating symmetric loading in a divide-by-two circuit, in accordance with an embodiment of the invention. Referring to FIG. 5, control may be initiated at start 502. In step 504, a first divide-by-two circuit may generate an I component of a first signal. In step 506, the first divide-by-two circuit may generate a Q component of the first signal. In step 508, a second divider circuit may be coupled to the generated I component signal of the first divider circuit. In step 510, a dummy load may be coupled to the generated Q component signal of the first divider circuit. The dummy load may comprise a load that may be equivalent to the second divider circuit. In step 512, the second divide-by-two circuit may receive the generated I component signal from the first divide-by-two circuit. In step 514, the dummy load may receive the generated Q component signal from the first divide-by-two circuit. In step 516, the second divide-by-two circuit may generate an I component output signal. In step 518, the second divide-by-two circuit may generate a Q component output signal. Control then passes to end 520.

In accordance with an embodiment of the invention, a system for symmetrically loading a divider circuit for multiband receivers may be provided. In this regard, a second divider circuit 304 (FIG. 3) may be coupled to an I component output signal of a first divider circuit 302 and a dummy load 306 may be coupled to a Q component output signal of the first divider circuit 306. The dummy load 306 may comprise a load that may be equivalent to the second divider circuit 304. The second divider circuit 304 may comprise logic and/or circuitry that may be adapted to generate an I component output signal and a Q component output signal. The second divider circuit 304 may be adapted to receive an I component signal that may be generated from the first divider circuit 302. The dummy load 306 may be adapted to receive a Q component signal that may be generated from the first divider circuit 302.

In another aspect of the invention, a system for symmetrically loading a divider circuit for multiband receivers may be provided. In this regard, a second divider circuit 304 may be adapted to receive an I component signal from a first divider circuit 302 and a dummy load 306 may be adapted to receive a Q component signal from the first divider circuit 302. The dummy load 306 may comprise a load that may be equivalent to a load of the second divider circuit 304. The first divider circuit 302 may be adapted to generate an I component signal and a Q component signal. The second divider circuit 304 may be adapted to generate an I component signal and a Q component signal.

In accordance with another embodiment of the invention, a divider circuit 400 [FIG. 4] may comprise an output circuitry block 402. A drain of at least a first transistor M1 404 may be coupled to the output circuitry block 402 and a drain of at least a third transistor M3 408. A drain of at least a second transistor M2 406 may be coupled to the output circuitry block 402 and a drain of at least a fourth transistor M4 410. The drain of the third transistor M3 408 may be coupled to the output circuitry block 402 and the drain of the first transistor M1 404. The drain of the fourth transistor M4 410 may be coupled to the output circuitry block 402 and the drain of the second transistor M2 406. A source of the first transistor M1 404 may be coupled to a source of the second transistor M2 406 and a drain of at least a fifth transistor M5 412. A source of the third transistor M3 408 may be coupled to a source of the fourth transistor M4 410 and a drain of at least a seventh transistor M7 416. A source of the fifth transistor M5 412 may be coupled to a drain of at least a sixth transistor M6 414. A source of the seventh transistor M7 416 may be coupled to a drain of at least a eighth transistor M8 418. The divider circuit 400 may comprise a first input 420 that may be coupled to a gate of the first transistor M1 404. A second input 420 may be coupled to a gate of the second transistor M2 406. A third input 422 may be coupled to a gate of the third transistor M3 408 and a fourth input 422 may be coupled to a gate of the fourth transistor M4 410. The divider circuit 400 may further comprise a voltage source VDCbias 424 coupled to a gate of the fifth transistor M5 412, a gate of the sixth transistor M6 414 and a gate of the seventh transistor M7 416. The first input 420 and the second input 420 may be complementary. Similarly, the third input 422 and the fourth input 422 may be complementary. The first transistor M1 404, second transistor M2 406, third transistor M3 408, fourth transistor M4 410, fifth transistor M5 412, sixth transistor M6 414, seventh transistor M7 416 and eighth transistor M8 418 may be NMOS transistors. A substrate of the first transistor M1 404, a substrate of the second transistor M2 406, a substrate of the third transistor M3 408 and a substrate of the fourth transistor M4 410 may be coupled to ground GND 426. The source of the sixth transistor M6 414, source of the eighth transistor M8 418 and gate of the eighth transistor M8 418 may be coupled to ground GND 426.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for symmetrically loading a divider circuit for multiband receivers, the method comprising:
   coupling a second divider circuit to an I component output signal of a first divider circuit; and
   coupling a dummy load to a Q component output signal of said first divider circuit, wherein said dummy load comprises a load that is equivalent to said second divider circuit and a gate of a transistor in said dummy load is directly coupled to ground so that said transistor is turned OFF.

2. The method according to claim 1, further comprising generating an I component output signal from said second divider circuit.

3. The method according to claim 1, further comprising generating a Q component signal output from said second divider circuit.

4. The method according to claim 1, further comprising receiving an I component signal generated from said first divider circuit by said second divider circuit.

5. The method according to claim 1, further comprising receiving a Q component signal generated from said first divider circuit by said dummy load.

6. A method for symmetrically loading a divider circuit for multiband receivers, the method comprising:
receiving an I component signal by a second divider circuit from a first divider circuit; and
receiving a Q component signal by a dummy load from said first divider circuit wherein said dummy load comprises a load that is equivalent to a load of said second divider circuit and a gate of a transistor in said dummy load is directly coupled to ground so that said transistor is turned OFF.

7. The method according to claim 6, further comprising generating an I component signal from said first divider circuit.

8. The method according to claim 6, further comprising generating a Q component signal from said first divider circuit.

9. The method according to claim 6, further comprising generating an I component signal from said second divider circuit.

10. The method according to claim 6, further comprising generating a Q component signal from said second divider circuit.

11. A system for symmetrically loading a divider circuit for multiband receivers, the system comprising:
a second divider circuit coupled to an I component output signal of a first divider circuit; and
a dummy load coupled to a Q component output signal of said first divider circuit, wherein said dummy load comprises a load that is equivalent to said second divider circuit and a gate of a transistor in said dummy load is directly coupled to ground so that said transistor is turned OFF.

12. The system according to claim 11, wherein said second divider circuit generates an I component output signal.

13. The system according to claim 11, wherein said second divider circuit generates a Q component output signal.

14. The system according to claim 11, further comprising said second divider circuit that receives an I component signal generated from said first divider circuit.

15. The system according to claim 11, further comprising said dummy load that receives a Q component signal generated from said first divider circuit.

16. A system for symmetrically loading a divider circuit for multiband receivers, the system comprising:
a second divider circuit that receives an I component signal from a first divider circuit; and
a dummy load that receives a Q component signal from said first divider circuit wherein said dummy load comprises a load that is equivalent to a load of said second divider circuit and a gate of a transistor in said dummy load is directly coupled to ground so that said transistor is turned OFF.

17. The system according to claim 16, wherein said first divider circuit generates an I component signal.

18. The system according to claim 16, wherein said first divider circuit generates a Q component signal.

19. The system according to claim 16, wherein said second divider circuit generates an I component signal.

20. The system according to claim 16, wherein said second divider circuit generates a Q component signal.

21. The method according to claim 1, wherein said coupling of said gate of said transistor in said dummy load to said ground disables flow of current in said dummy load.

22. The system according to claim 11, wherein said coupling of said gate of said transistor in said dummy load to said ground disables flow of current in said dummy load.

23. The method according to claim 1, comprising coupling a gate of a transistor in said second divider circuit to ground in a PCS mode of operation.

24. The method according to claim 1, comprising coupling a gate of a transistor in said second divider circuit to ground in a DCS mode of operation.

25. The method according to claim 1, comprising coupling a gate of a transistor in said second divider circuit to a voltage source in a GSM mode of operation.

* * * * *